G. F. FISHER.
TIRE FABRIC AND METHOD OF MAKING THE SAME.
APPLICATION FILED SEPT. 22, 1915.

1,224,878.

Patented May 1, 1917.

WITNESS:
S. H. Taylor.

INVENTOR
George F. Fisher.
BY
Ernest Hopf Burnett,
HIS ATTORNEY

UNITED STATES PATENT OFFICE.

GEORGE F. FISHER, OF PLAINFIELD, NEW JERSEY, ASSIGNOR TO THE HARTFORD RUBBER WORKS COMPANY, A CORPORATION OF CONNECTICUT.

TIRE FABRIC AND METHOD OF MAKING THE SAME.

1,224,878.

Specification of Letters Patent. Patented May 1, 1917.

Application filed September 22, 1915. Serial No. 51,998.

*To all whom it may concern:*

Be it known that I, GEORGE F. FISHER, a citizen of the United States, residing at Plainfield, county of Union, State of New Jersey, have invented certain new and useful Improvements in Tire Fabrics and Methods of Making the Same, of which the following is a full, clear, and exact description.

My invention relates to fabrics employed in building or making tire carcasses, and has for its object the improvement of such fabrics in such a manner as to increase the resiliency of the tire when completed, to equalize all strains or tensions in the fabrics, to decrease the wearing or abrasion between the threads or strands of the fabrics, thereby increasing the useful life of the tire, to do away with overlapping ends and also to diminish the time required in making a tire carcass.

Briefly stated, my invention comprises the process or method of forming a tire fabric by braiding the same upon a cylindrical or corrugated form, preferably consisting of a series of superposed annular forms or cores of substantially the size corresponding to the interior of a tire casing and then cutting the fabric circumferentially between the partially formed annular portions so made.

The cutting of the fabric so formed, circumferentially between the annular portions or corrugations, produces a series of annular rings which have their outer portions arc-shaped in cross-section taken on planes passing through the axis of the band or of the tire when completed, the strands being diagonal thereto.

Figure 1:
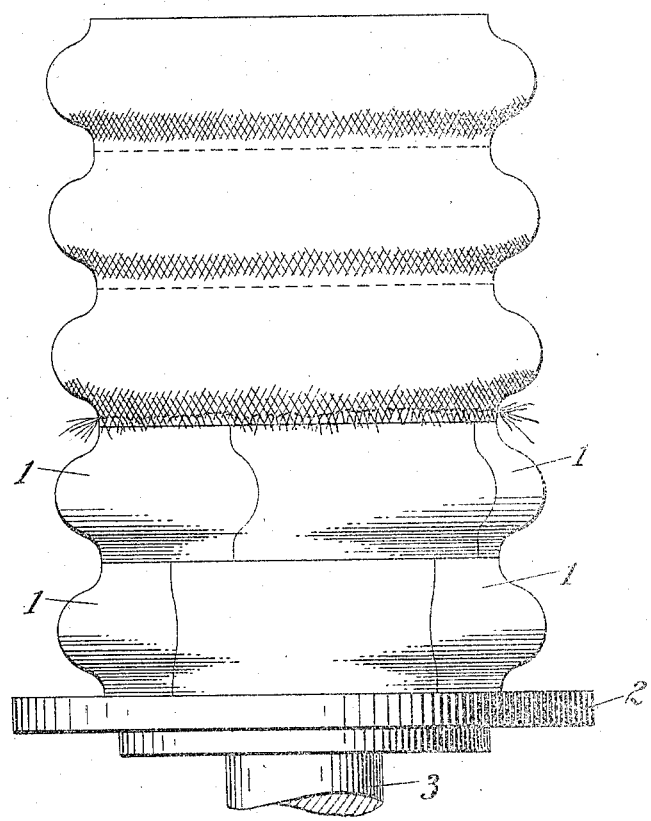
Figure 2:
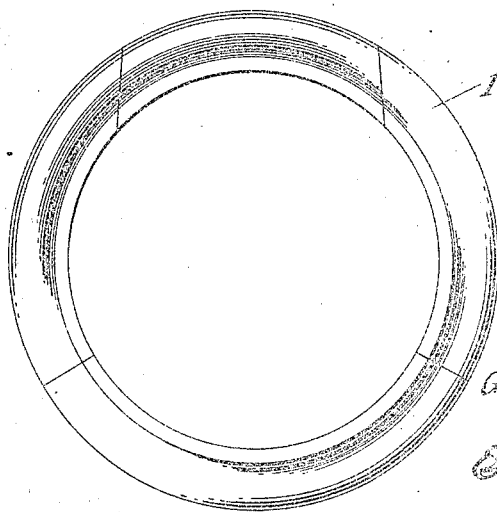

For a description of one manner of utilizing my invention, reference may be had to the following specification and to the accompanying drawing forming a part thereof, in which: Figure 1 is an elevation of that part of a machine in which the fabric is braided, showing the forms or cores and the fabric during the process of forming the same; and Fig. 2 is a plan view of one of the forms.

The numeral 1 indicates a series of forms or cores which are preferably made sectional, and therefore collapsible, to facilitate removal when the fabric has been braided thereon. The cores are superposed on each other and moved upward by any suitable device, such as by a table 2 supported on a central standard 3 which may be raised or lowered hydraulically or by other mechanical means. It is obvious that the form 1 need not be in the shape shown, but may be made cylindrical exteriorly, or of other shapes, if desired. The forms also may be caused to move downward during the braiding operation, instead of upward, if desired. When the forms are caused to move upward those on which the covering of fabric has been braided are removed from the top and other forms added at the bottom, thus permitting the continuous operation of the machine.

The mechanism for causing the braiding of the strands may comprise any preferred form of braiding, the shuttles and other parts being so designed to accommodate the machine to the diameter of the tubular fabric being made, according to the size of the tire being manufactured.

The yarn used in braiding the fabric may be first impregnated with or laid in rubber during the braiding operation by the use of apparatus of which that disclosed in the patent to H. Z. Cobb, No. 1,002,644, dated September 5, 1911, is a type.

I am aware that it has been proposed to weave a fabric for tires on a plurality of annular forms, such as those disclosed in the patent to J. Lyall, No. 505,294, dated September 19, 1893, but the production of such a fabric is not the object of my invention which produces a fabric in which the threads run diagonally or on the bias, thus affording greater resiliency and flexibility in a tire in which the fabric is used.

I am also aware that it has been proposed to braid a fabric in the form of an annular tube and then to cut the tube on its inner circumference so as to permit the formation of clencher edges or wire retaining means, as instanced in the patent to O. Schaefer, No. 722,459, dated March 10, 1903. That manner of forming a tire fabric necessarily requires a joining or overlapping of the two ends of the tube, while the fabric formed by my method is continuous about its entire circumference and without seam or lap. Furthermore, in the use of the process of my invention the strands may be more accurately spaced relative to each other and laid at such a distance from each other that the rubber of the tire may penetrate between the strands to the desired degree.

The fabric made according to my invention may also be more easily and smoothly shaped about the final core or form on which the tire is built or completed, than is the case where the threads or strands run circumferentially and transversely of the tire, owing to the fact that the threads may be more easily forced nearer together on the smaller circumferential lines without wrinkling the fabric. I am also enabled, if desired, to make a tire carcass having a single ply of comparatively heavy fabric, thus utilizing the greater flexibility of such a fabric without encountering the difficulties which usually arise from the use of a woven fabric because of its greater stiffness and inability to contract on circumferential lines.

Having thus described this form of my invention, I claim and desire to protect by Letters Patent:

1. A tire fabric, comprising an endless annular strip or ring of braided rubberized fabric having substantially the shape of a tire cut from a continuous tube having its strands arranged diagonally or helically.

2. A tire fabric, comprising an unjointed circumferentially endless strip of rubberized fabric having the shape of a torus, the strands of said fabric being arranged diagonally or helically.

3. The method of making tire carcasses, which comprises braiding a continuous longitudinally corrugated tube thereof by forming helically arranged intermeshing strands conforming to said corrugations and then cutting said tube into successive annular strips between said corrugations.

4. The method of making fabric for tire carcasses, which comprises braiding a plurality of intermeshing strands of yarn continuously on a series of separable forms having substantially the shape of a tire core, rubberizing said strands, and then cutting the braided strands into successive annular strips.

5. The method of making fabric for tire carcasses, which comprises continuously braiding a plurality of intermeshing strands helically on a series of separable forms having substantially the shape of a tire core, rubberizing said strands, and then cutting the braided strands into successive annular strips.

Signed at New York, N. Y., this 20th day of September, 1915.

GEORGE F. FISHER.